US012241392B2

(12) United States Patent
Fujiwara

(10) Patent No.: US 12,241,392 B2
(45) Date of Patent: Mar. 4, 2025

(54) CYLINDER HEAD COVER

(71) Applicant: TOYOTA JIDOSHA KABUSHIKI KAISHA, Toyota (JP)

(72) Inventor: Sho Fujiwara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/678,581

(22) Filed: May 30, 2024

(65) Prior Publication Data

US 2024/0401510 A1 Dec. 5, 2024

(30) Foreign Application Priority Data

Jun. 5, 2023 (JP) ................................ 2023-092325

(51) Int. Cl.
*F01M 13/00* (2006.01)
*F01M 13/04* (2006.01)
*F02F 7/00* (2006.01)

(52) U.S. Cl.
CPC ......... *F01M 13/0416* (2013.01); *F02F 7/006* (2013.01)

(58) Field of Classification Search
CPC ............................ F01M 13/0416; F02F 7/006
See application file for complete search history.

(56) References Cited

U.S. PATENT DOCUMENTS

| | | | | | |
|---|---|---|---|---|---|
| 4,602,595 | A * | 7/1986 | Aoki | F01M 13/0416 | 55/482 |
| 4,602,607 | A * | 7/1986 | Balsley | F01M 13/023 | 123/41.86 |
| 4,667,647 | A * | 5/1987 | Ohtaka | F01M 5/001 | 123/573 |
| 6,412,478 | B1 * | 7/2002 | Ruehlow | F01M 13/0416 | 123/41.86 |
| 7,047,955 | B2 * | 5/2006 | Ookawa | F01M 13/022 | 123/572 |
| 7,246,612 | B2 * | 7/2007 | Shieh | F01M 13/04 | 123/572 |
| 7,509,951 | B1 * | 3/2009 | Smith | F01M 13/0416 | 123/573 |
| 8,210,135 | B2 * | 7/2012 | Slaughter | F01M 13/04 | 123/41.86 |

(Continued)

FOREIGN PATENT DOCUMENTS

JP 2020-200777 A 12/2020

*Primary Examiner* — Phutthiwat Wongwian
*Assistant Examiner* — Sherman D Manley
(74) *Attorney, Agent, or Firm* — Finnegan, Henderson, Farabow, Garrett, and Dunner, LLP

(57) ABSTRACT

A cylinder head cover for a hydrogen-fueled internal combustion engine includes a head cover body and an outlet passage. The head cover body defines a main passage for blow-by gas that has leaked from a combustion chamber to a crankcase. The outlet passage is connected to a downstream end of the main passage and conducts the blow-by gas to an intake passage. The main passage includes a restriction in a middle of the main passage. The cylinder head cover further includes an auxiliary passage. The auxiliary passage is connected to a section of the main passage that is on the upstream side of the restriction. The auxiliary passage conducts the blow-by gas to the outlet passage or the intake passage.

4 Claims, 2 Drawing Sheets

(56) References Cited

U.S. PATENT DOCUMENTS

| | | | | |
|---|---|---|---|---|
| 8,511,291 | B2 * | 8/2013 | Hirano | F01M 13/022 123/193.5 |
| 11,015,500 | B2 * | 5/2021 | Chung | F01M 13/04 |
| 12,006,853 | B2 * | 6/2024 | Matsura | F01P 3/16 |
| 2005/0005921 | A1 * | 1/2005 | Ikeda | F02M 25/06 123/572 |
| 2007/0215128 | A1 * | 9/2007 | Yonebayashi | F01M 13/0416 123/572 |
| 2010/0018493 | A1 * | 1/2010 | Song | F01M 13/0416 123/195 C |
| 2017/0167331 | A1 * | 6/2017 | Park | F01M 13/04 |

* cited by examiner

CYLINDER HEAD COVER

CROSS-REFERENCE TO RELATED APPLICATIONS

This application is based upon and claims the benefit of priority from prior Japanese Patent Application No. 2023-092325, filed on Jun. 5, 2023, the entire contents of which are incorporated herein by reference.

BACKGROUND

1. Field

The present disclosure relates to a cylinder head cover.

2. Description of Related Art

Japanese Laid-Open Patent Publication No. 2020-200777 discloses an oil separator formed integrally with a cylinder head cover. The oil separator includes a gas passage for blow-by gas. This gas passage is configured to conduct blow-by gas that has leaked from the combustion chamber to the crankcase to the intake passage.

Such an oil separator as described in the above publication may include a restriction, which has a relatively small cross-sectional flow area, in the middle of the gas passage. In such a structure, the flow velocity of the blow-by gas is increased on the downstream side of the restriction in the gas passage. In particular, in a hydrogen engine, which uses hydrogen as fuel, blow-by gas contains a relatively large amount of moisture. Therefore, oil and moisture are agitated on the downstream side of the restriction in the gas passage, and emulsion is likely to form.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a cylinder head cover for a hydrogen-fueled internal combustion engine includes a head cover body that defines a main passage for blow-by gas that has leaked from a combustion chamber to a crankcase, and an outlet passage that is connected to a downstream end of the main passage and configured to conduct the blow-by gas to an intake passage. The main passage includes a restriction in a middle of the main passage. A section of the main passage on an upstream side of the restriction is referred to as an upstream passage. A section of the main passage on a downstream side of the restriction is referred to as a downstream passage. A cross-sectional flow area of the restriction is smaller than a cross-sectional flow area of the upstream passage and smaller than a cross-sectional flow area of the downstream passage. The cylinder head cover further comprises an auxiliary passage that is connected to the upstream passage and configured to conduct the blow-by gas to the outlet passage or to the intake passage.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
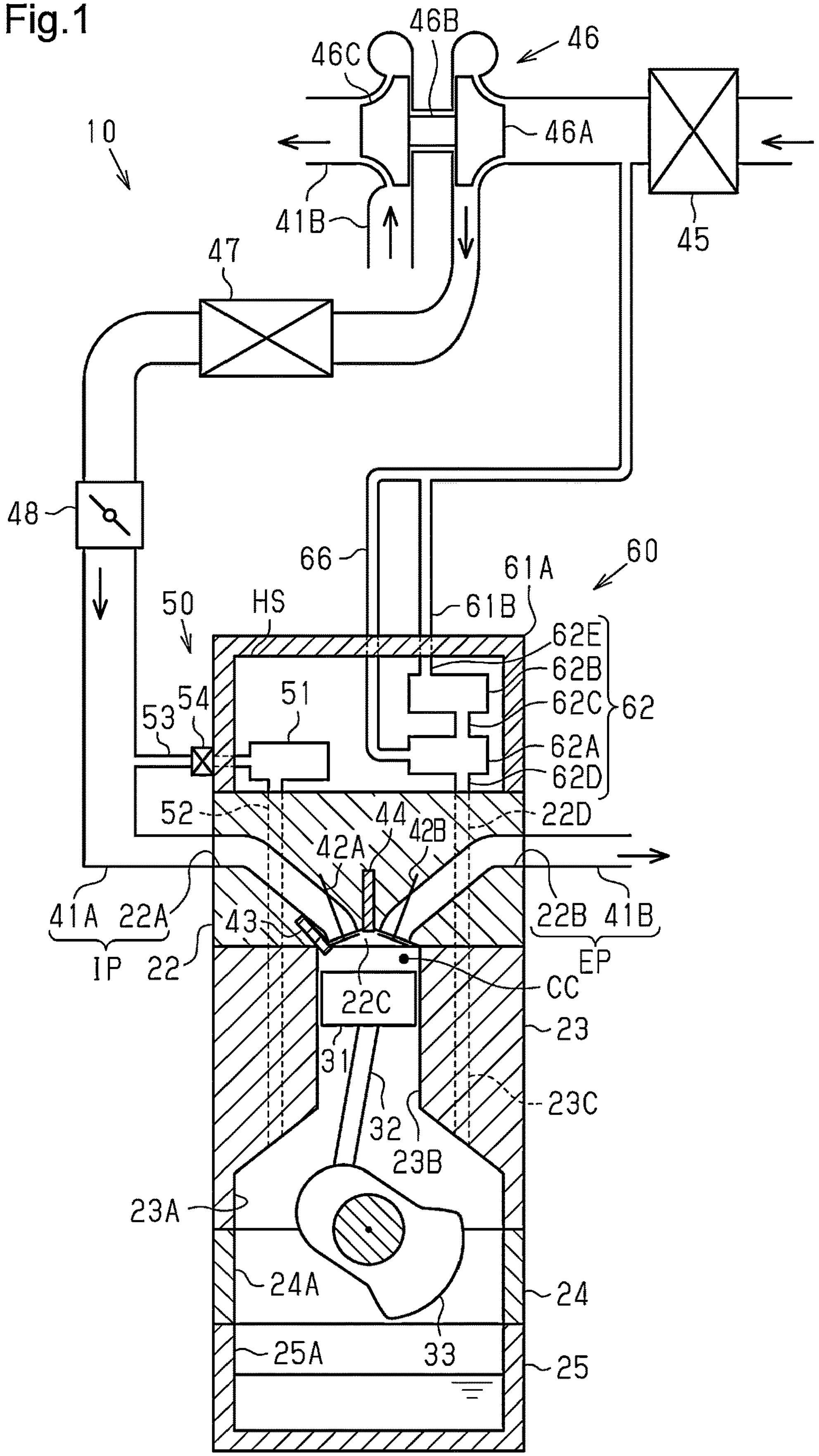
FIG. 1 is a schematic diagram showing an internal combustion engine according to an embodiment.

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, “at least one of A and B” should be understood to mean “only A, only B, or both A and B.”

Cylinder Head Cover of Embodiment

Hereinafter, an embodiment of a cylinder head cover will be described with reference to the drawings. In the drawings, components may be illustrated in an enlarged manner for easy understanding. The dimensional ratios of the components may be different from the actual ones or those in other drawings.

Overall Configuration

As shown in FIG. 1, the internal combustion engine 10 includes an oil pan 25, a crankcase 24, a cylinder block 23, a cylinder head 22, and a cylinder head cover 60. The internal combustion engine 10 includes a plurality of pistons 31, a plurality of connecting rods 32, and a crankshaft 33.

The oil pan 25 is positioned at a lower end of the internal combustion engine 10. The oil pan 25 has a substantially rectangular box shape with a bottom. The oil pan 25 defines an oil space 25A for storing oil. The oil stored in the oil space 25A is supplied to each part of the internal combustion engine 10 by a pump (not shown).

The crankcase 24 is connected to an upper end of the oil pan 25. The crankcase 24 defines a lower space 24A as a space inside the crankcase 24. The lower space 24A extends from the upper end to the lower end of the crankcase 24. The lower space 24A is connected to the upper end of the oil space 25A.

The cylinder block 23 defines an upper space 23A and a cylinder 23B as an internal space of the cylinder block 23. The upper space 23A is connected to an upper end of the lower space 24A. The upper space 23A extends from the lower end of the cylinder block 23 to the vicinity of the center in the up-down direction. The cylinders 23B extend from an upper end of the upper space 23A to an upper end of the cylinder block 23. In FIG. 1, only one of the cylinders 23B is shown as a representative. The cylinder block 23 defines a first blow-by gas passage 23C. A lower end of the first blow-by gas passage 23C is connected to the upper space 23A. The first blow-by gas passage 23C extends to the upper end of the cylinder block 23.

The piston 31 is located inside the cylinder 23B. The crankshaft 33 is located in the upper space 23A and the lower space 24A. The connecting rod 32 connects the piston 31 and the crankshaft 33. Therefore, when the air-fuel mixture of the fuel and the intake air burns in the cylinder 23B, the piston 31 reciprocates in the cylinder 23B. The reciprocating motion of the piston 31 is transmitted to the crankshaft 33 as a rotational motion via the connecting rod 32.

The cylinder head 22 is connected to an upper end of the cylinder block 23. The cylinder head 22 defines a combustion recess 22C, an intake port 22A, and an exhaust port 22B as an internal space of the cylinder head 22. The combustion recess 22C is recessed upward from the lower surface of the cylinder head 22. The combustion recess 22C is connected to the upper end of the cylinder 23B. The combustion recess 22C, the cylinders 23B, and the pistons 31 define a combustion chamber CC. Further, the cylinder head 22 defines a second blow-by gas passage 22D. A lower end of the second blow-by gas passage 22D is connected to an upper end of the first blow-by gas passage 23C. The second blow-by gas passage 22D extends to the upper end of the cylinder head 22.

The first end of the intake port 22A is connected to the combustion recess 22C. A second end of the intake port 22A opens to a side surface of the cylinder head 22. The first end of the exhaust port 22B is connected to the combustion recess 22C. A second end of the exhaust port 22B opens to a side surface of the cylinder head 22.

The internal combustion engine 10 includes an intake pipe 41A and an exhaust pipe 41B. The intake pipe 41A is connected to the second end of the intake port 22A. The intake pipe 41A introduces intake air from the outside of the internal combustion engine 10 into the intake port 22A. Then, the intake port 22A introduces the intake air that has flowed through the intake pipe 41A into the cylinder 23B. In the present embodiment, the intake port 22A and the intake pipe 41A form the intake passage IP of the internal combustion engine 10.

The exhaust pipe 41B is connected to the second end of the exhaust port 22B. The exhaust port 22B discharges exhaust gas from the cylinders 23B to the exhaust pipe 41B. The exhaust pipe 41B discharges the exhaust gas flowing through the exhaust port 22B to the outside of the internal combustion engine 10. In the present embodiment, the exhaust port 22B and the exhaust pipe 41B are an exhaust passage EP of the internal combustion engine 10.

The cylinder head cover 60 includes a head cover body 61A. The head cover body 61A is connected to an upper end of the cylinder head 22. The head cover body 61A covers the cylinder head 22. The head cover body 61A defines the housing space HS together with the cylinder head 22. The housing space HS houses a valve mechanism (not shown) and the like. Details of the cylinder head cover 60 will be described later.

The internal combustion engine 10 includes a plurality of intake valves 42A, a plurality of exhaust valves 42B, a plurality of fuel injection valves 43, and a plurality of ignition devices 44.

The intake valves 42A are located at connecting portions between the intake ports 22A and the cylinders 23B. The intake valves 42A open and close the openings at the first ends of the intake ports 22A by a driving force from a valve-operating mechanism (not shown). The exhaust valve 42B is located at a connecting portion between the exhaust port 22B and the cylinders 23B. The exhaust valve 42B opens and closes the opening at the first end of the exhaust port 22B by a driving force from a valve mechanism (not shown).

The tip of the fuel injection valve 43 is located in the combustion recess 22C. Hydrogen stored in a fuel tank (not shown) is supplied to the fuel injection valve 43. The fuel injection valve 43 injects hydrogen as fuel into the combustion chamber CC. The tip of the ignition device 44 is located in the combustion recess 22C. The ignition device 44 ignites a mixture of fuel and intake air by spark discharge.

The internal combustion engine 10 includes an air cleaner 45, a turbocharger 46, an intercooler 47, and a throttle valve 48.

The turbocharger 46 includes a compressor wheel 46A, a coupling shaft 46B, and a turbine wheel 46C. The compressor wheel 46A is positioned in the middle of the intake pipe 41A. A first end of the coupling shaft 46B is connected to the compressor wheel 46A. A second end of the coupling shaft 46B is connected to the turbine wheel 46C. The turbine wheel 46C is located in the middle of the exhaust pipe 41B. Therefore, when the turbine wheel 46C is rotated by the flow of the exhaust gas in the exhaust pipe 41B, the compressor wheel 46A is rotated together via the coupling shaft 46B. As a result, the intake air compressed by the compressor wheel 46A is supplied to the downstream side of the intake pipe 41A with respect to the compressor wheel 46A.

The air cleaner 45 is located in a portion of the intake pipe 41A on the upstream side of the compressor wheel 46A. The air cleaner 45 collects foreign matter contained in the intake air flowing through the intake pipe 41A. The intercooler 47 is located in a portion of the intake pipe 41A on the downstream side of the compressor wheel 46A. The intercooler 47 cools the intake air compressed by the compressor wheel 46A. The throttle valve 48 is located in a portion of the intake pipe 41A on the downstream side of the intercooler 47. The throttle valve 48 adjusts the amount of intake air flowing through the intake pipe 41A.

The internal combustion engine 10 includes a blow-by gas treatment device 50. The blow-by gas treatment device 50 is a device that recirculates blow-by gas, which has leaked from the combustion chamber CC into the upper space 23A of the cylinder block 23 and the lower space 24A of the crankcase 24, to the intake pipe 41A. The blow-by gas treatment device 50 includes a main separator 51, a suction passage 52, a PCV passage 53, and a PCV valve 54.

The main separator 51 is located in the housing space HS of the cylinder head cover 60. The main separator 51 collects oil contained in the gas flowing through the main separator 51. A first end of the suction passage 52 is connected to the main separator 51. A second end of the suction passage 52 is connected to the upper space 23A of the cylinder block 23. Although not shown, the main separators 51 are connected to the intake pipe 41A via an ejector and a bypass passage.

A first end of the PCV passage 53 is connected to the main separator 51. A second end of the PCV passage 53 is connected to a portion of the intake pipe 41A on the downstream side when viewed from the throttle valve 48. The PCV valve 54 is positioned in the middle of the PCV passage 53. The PCV valve 54 opens and closes a passage of the PCV passage 53.

Configuration of Cylinder Head Cover

As described above, the cylinder head cover 60 includes the head cover body 61A and the outlet passage 61B.

The head cover body 61A has a substantially rectangular box shape as a whole. In the following description, a shaft extending along a long side of the head cover body 61A is referred to as a first axis X. In addition, a shaft extending along the short side of the head cover body 61A is referred to as a second axis Y. Further, one of the directions along the first axis X is defined as a first positive direction X1, and a direction opposite to the first positive direction X1 in the directions along the first axis X is defined as a first negative direction X2. One of the directions along the second axis Y is referred to as a second positive direction Y1, and a direction opposite to the second positive direction Y1 in the directions along the second axis Y is referred to as a second negative direction Y2.

Figure 2:
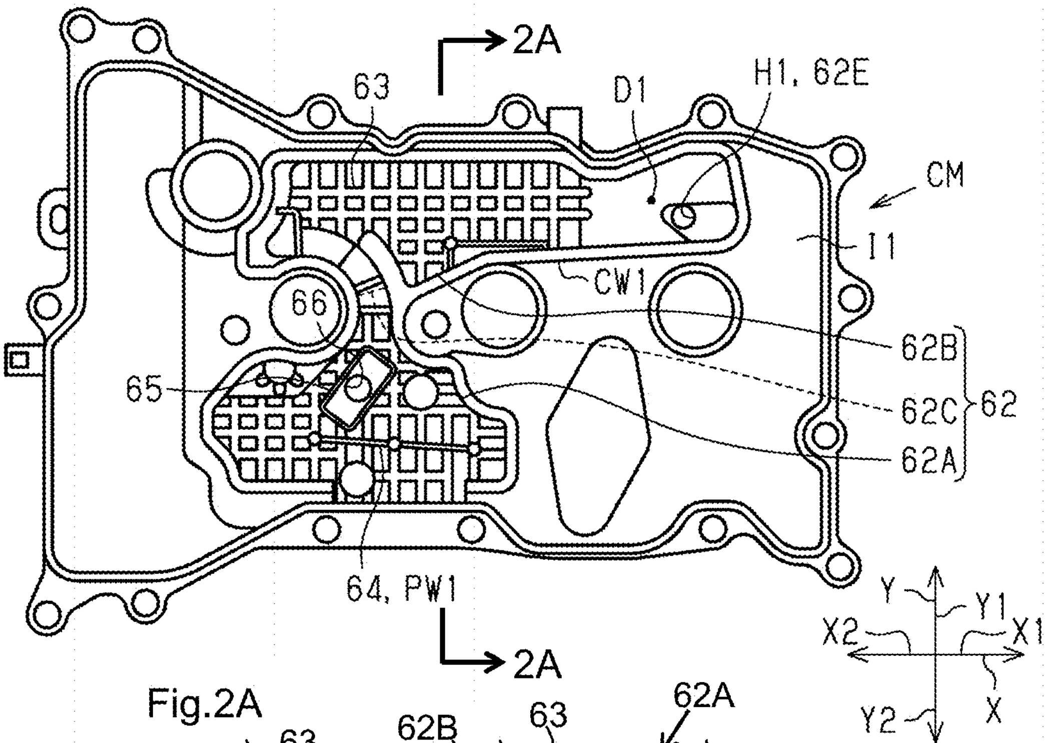
FIG. 2 is a top view of a cover portion of a head cover body.
Figure 3:
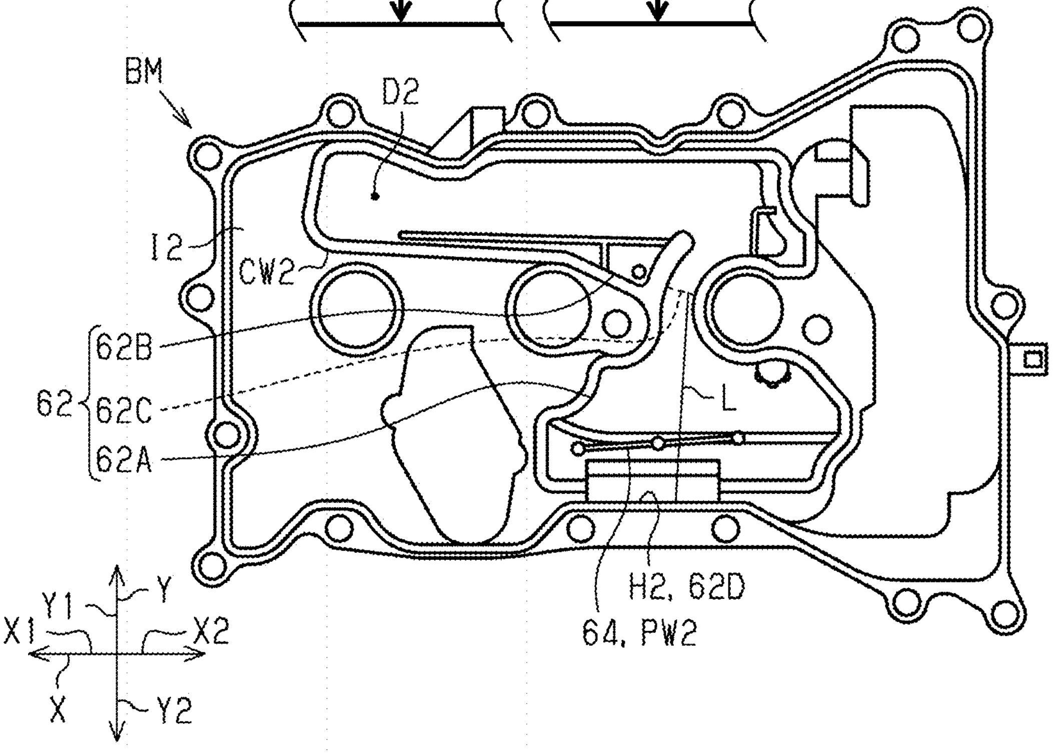
FIG. 3 is a top view of a bottom portion of the head cover body.

As shown in FIGS. 2 and 3, the head cover body 61A includes a cover portion CM and a bottom portion BM.

As shown in FIG. 2, the cover portion CM has a substantially rectangular plate shape elongated in the direction along the first axis X. The cover portion CM includes a first inner surface I1, a first partition wall CW1, and a discharge hole H1. The first inner surface I1 faces the cylinder block 23 when the head cover body 61A is connected to the upper end of the cylinder block 23. The first partition wall CW1 protrudes from the first inner surface I1. The first partition wall CW1 defines, together with the first inner surface I1, a first recess D1 that opens in the direction in which the first inner surface I1 faces. When the cover portion CM is seen in a plan view, the first recess D1 is a substantially L-shaped space. To be more specific, the first recess D1 extends from the second negative direction Y2 side to the second positive direction Y1 side with respect to the center of the cover portion CM, and then extends toward the first positive direction X1 side. The discharge hole H1 is a through hole that penetrates the cover portion CM. The discharge hole H1 is located in the vicinity of an end of the first recess D1 on the first positive direction X1 side and the second positive direction Y1 side. Note that the planar view means that the cover portion CM is viewed in a direction in which the apparent area of the cover portion CM is maximized. The same applies to the following plan views.

As shown in FIG. 3, the bottom portion BM has a substantially rectangular plate shape that is long in the direction along the first axis X. The outer edge of the bottom portion BM substantially coincides with the outer edge of the cover portion CM in plan view. The bottom portion BM includes a second inner surface I2, a second partition wall CW2, and an intake hole H2. The second inner surface I2 is a surface facing away from the cylinder block 23 when the head cover body 61A is connected to the upper end of the cylinder block 23. The second partition wall CW2 protrudes from the second inner surface I2. The second partition wall CW2 defines, together with the second inner surface I2, a second recess D2 that opens in the direction in which the second inner surface I2 faces. In a plan view of the bottom portion BM, the second recess D2 has substantially the same shape as the first recess D1. To be more specific, the second recess D2 extends from the second negative direction Y2 side to the second positive direction Y1 side with respect to the center of the bottom portion BM, and extends toward the first positive direction X1 side. The intake hole H2 is a through hole that penetrates the bottom portion BM. The intake hole H2 is located at an end of the second recess D2 on the second negative direction Y2 side.

The head cover body 61A is formed by fitting the cover portion CM and the bottom portion BM together such that the first inner surface I1 and the second inner surface I2 face each other. In such a fitted state, the outer edge shape of the first recess D1 and the outer edge shape of the second recess D2 substantially coincide with each other. The main passage 62 of the head cover body 61A is formed by the first recess D1 and the second recess D2. The upstream end 62D of the main passage 62 is the intake hole H2 of the bottom portion BM. An upstream end 62D of the main passage 62 is connected to an upper end of the second blow-by gas passage 22D in the cylinder head 22. The downstream end 62E of the main passage 62 is the discharge hole H1 of the cover portion CM. Details of the main passage 62 will be described later.

As shown in FIG. 1, the outlet passage 61B is a passage for leading the blow-by gas to the intake passage IP. A first end of the outlet passage 61B is connected to the downstream end 62E of the main passage 62. The second end of the outlet passage 61B is connected to a portion of the intake pipe 41A on the downstream side of the air cleaner 45 and on the upstream side of the compressor wheel 46A. Therefore, the blow-by gas leaking from the combustion chamber CC to the crankcase 24 can flow to the intake passage IP through the first blow-by gas passage 23C, the second blow-by gas passage 22D, the main passage 62, and the outlet passage 61B.

Passage of Blow-by Gas

As shown in FIGS. 2 and 3, the main passage 62 has a restriction 62C in the middle of the main passage. In the main passage 62, a passage on the upstream side of the restriction 62C is referred to as an upstream passage 62A. A passage on the downstream side of the restriction 62C in the main passage 62 is referred to as a downstream passage 62B. In this embodiment, the restriction 62C is a section of the main passage 62 that has the smallest cross-sectional flow area. Therefore, the cross-sectional flow area of the restriction 62C is smaller than the cross-sectional flow area of the upstream passage 62A. Also, the cross-sectional flow area of the restriction 62C is smaller than the cross-sectional flow area of the downstream passage 62B. The cross-sectional flow area refers to the cross-sectional area of the main passage 62 orthogonal to the passage direction when the passage of the blow-by gas is assumed.

The upstream passage 62A is a portion on the second negative direction Y2 side with respect to the restriction 62C. The first end of the upstream passage 62A coincides with the upstream end 62D of the main passage 62. Therefore, in the upstream passage 62A, the blow-by gas flows in the second positive direction Y1 as a whole.

The downstream passage 62B is a portion on the second positive direction Y1 side with respect to the restriction 62C. The second end of the downstream passage 62B coincides with the downstream end 62E of the main passage 62. Therefore, in the downstream passage 62B, the blow-by gas flows in the first positive direction X1 as a whole.

Figure 2A:
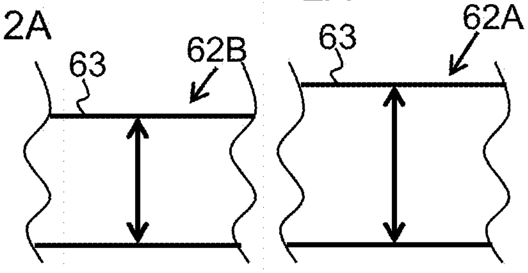
FIG. 2A is a detailed view of a portion of FIG. 2 (identified by a portion designation 2A-2A in FIG. 2), showing the difference between a height dimension of a rib 63 in a downstream passage 62B and a rib 63 in an upstream passage 62A, as viewed in a direction orthogonal to a wall surface I1.

As shown in FIG. 2 and FIG. 2A, the head cover body 61A is provided with a rib 63. The rib 63 protrudes from a wall surface of the head cover body 61A that defines the main passage 62. To be more specific, the rib 63 protrudes from the first inner surface I1 of the cover portion CM in substantially the entire region of the upstream passage 62A and the downstream passage 62B. When the first inner surface I1 is seen in a plan view, the ribs 63 protrude in a lattice shape. Further, a dimension in a direction orthogonal to the first inner surface I1 is defined as a height dimension. The height dimension of the rib 63 in the downstream passage 62B is smaller than the height dimension of the rib 63 in the upstream passage 62A. To be more specific, the minimum height dimension of the rib 63 at the downstream passage 62B is smaller than the maximum height dimension of the rib 63 at the upstream passage 62A.

The cylinder head cover 60 includes a wall portion 64, a concavity 65, and an auxiliary passage 66.

The wall portion 64 protrudes from the inner surface of the head cover body 61A. To be more specific, the wall portion 64 is constituted by a first wall portion PW1 and a second wall portion PW2. As shown in FIG. 2, the first wall portion PW1 protrudes from the first inner surface I1 of the cover portion CM in the upstream passage 62A. In a plan view of the cover portion CM, the first wall portion PW1 extends substantially along the first axis X. As shown in FIG. 3, the second wall portion PW2 protrudes from the second inner surface I2 of the bottom portion BM in the upstream passage 62A. In a plan view of the bottom portion BM, the first wall portion PW1 extends substantially along the first axis X. In a state where the cover portion CM and the bottom portion BM are fitted to each other such that the first inner surface I1 and the second inner surface I2 face each other, a distal end of the first wall portion PW1 and a distal end of the second wall portion PW2 abut against each other. Thus, the first wall portion PW1 and the second wall portion PW2 form a single wall portion 64 that extends from the first inner surface I1 to the second inner surface I2. Further, as shown in FIG. 3, when the head cover body 61A is seen in plan view, the wall portion 64 intersects an arbitrary line segment L connecting the upstream end 62D of the main passage 62 and the restriction 62C.

The concavity 65 is recessed outward from the inner surface of the head cover body 61A in the upstream passage 62A. To be more specific, the concavity 65 is located on the first inner surface I1 of the cover portion CM on the downstream side of the wall portion 64 on the restriction 62C side. The concavity 65 is recessed in a direction opposite to the bottom portion BM with respect to the first inner surface I1 of the cover portion CM.

The auxiliary passage 66 is a tubular passage for conducting the blow-by gas to the outlet passage 61B or the intake passage IP. As shown in FIG. 1, the auxiliary passage 66 is located outside the head cover body 61A. A first end of the auxiliary passage 66 is connected to the upstream passage 62A. More specifically, the first end of the auxiliary passage 66 is connected to the bottom surface of the concavity 65. Therefore, the auxiliary passage 66 is connected to a section of the upstream passage 62A that is on the downstream side of the wall portion 64. A second end of the auxiliary passage 66 is connected to the middle of the outlet passage 61B.

Operation of the Present Embodiment

In the internal combustion engine 10, blow-by gas leaks from the combustion chamber CC to the crankcase 24. The blow-by gas flows into the main passage 62 via the first blow-by gas passage 23C and the second blow-by gas passage 22D. A auxiliary passage 66 is connected to the main passage 62 on the upstream side of the restriction 62C. Therefore, a portion of the blow-by gas flows through the auxiliary passage 66. That is, the flow of the blow-by gas is branched on the upstream side of the restriction 62C in the main passage 62.

Effects of the Present Embodiment (1) In the above-described embodiment, the cylinder head cover 60 includes the auxiliary passage 66. The auxiliary passage 66 is connected to an upstream passage 62A of the main passage 62. By conducting a portion of the blow-by gas to the auxiliary passage 66 in the upstream passage 62A, the flow speed of the blow-by gas in the downstream passage 62B is reduced. Therefore, it is possible to prevent the oil and the moisture from being agitated in the downstream passage 62B.

(2) In the above embodiment, the height dimension of the rib 63 of the downstream passage 62B is smaller than the height dimension of the rib 63 of the upstream passage 62A. Therefore, a turbulent flow of the blow-by gas is unlikely to occur around the rib 63. As a result, even when the blow-by gas flows into the periphery of the rib 63 on the downstream passage 62B, emulsion is relatively unlikely to occur.

(3) In the above embodiment, the head cover body 61A includes the wall portion 64. The wall portion 64 is located in the upstream passage 62A. The blow-by gas flows in from the upstream end 62D of the upstream passage 62A. At least a portion of the blow-by gas collides with the wall portion 64. At this time, the oil contained in the blow-by gas adheres to the wall portion 64, so it is easy to remove the oil.

(4) In the above-described embodiment, the auxiliary passage 66 is provided downstream of the wall portion 64. After some of the oil contained in the blow-by gas is removed by the wall portion 64, the blow-by gas flows into the auxiliary passage 66. Thus, it is possible to prevent a large amount of oil from flowing into the auxiliary passage 66.

(5) In the above embodiment, the auxiliary passage 66 is connected to the concavity 65 of the head cover body 61A. By intentionally connecting the auxiliary passage 66 to the concavity 65 in this way, the blow-by gas is relatively less likely to flow into the auxiliary passage 66. Therefore, it is possible to prevent the blow-by gas from excessively flowing into the auxiliary passage 66 and the amount of the blow-by gas flowing through the main passage 62 from being reduced.

Modifications

The above-described embodiment and the following modifications can be combined as long as the combined modifications remain technically consistent with each other.

The configurations of the head cover body 61A, the cover portion CM, and the bottom portion BM are not limited to the examples of the above-described embodiments. For example, the bottom portion BM may not include the second recess D2. In this case, the main passage 62 is formed only by the first recess D1 of the head cover body 61A. Further, the head cover body 61A may not be constituted by two members of the cover portion CM and the bottom portion BM. That is, the head cover body 61A may be configured by one integrally molded member, or may be configured by combining three or more members.

The configuration such as the shape, the position, and the size of the discharge hole H1 is not limited to the example of the embodiment. For example, the discharge hole H1 may be a through hole that penetrates the cover portion CM via the first partition wall CW1. Further, the discharge hole H1 may be a through hole that penetrates the bottom portion BM. The same applies to the intake hole H2.

The main passage 62 may include a plurality of restrictions 62C. Also in this case, if the auxiliary passage 66 is connected to the upstream passage 62A on the upstream side of any one of the restrictions 62C, the advantage described in (1) can be obtained on the downstream side of the restriction 62C.

The configuration such as the shape, size, and position of the upstream passage 62A is not limited to the example of the above embodiment. The same applies to the downstream passage 62B. Even if the configurations of the respective passages are different, the advantage described in (1) can be obtained as long as the restriction 62C and the auxiliary passage 66 are provided.

The configuration such as the shape, size, and position of the rib 63 is not limited to the example of the above-described embodiment. For example, the rib 63 may protrude from the first inner surface I1 of the cover portion CM only in the upstream passage 62A. The height dimension of the rib 63 at the downstream passage 62B may be equal to or larger than the height dimension of the rib 63 at the upstream passage 62A. The rib 63 may protrude from the second inner surface I2 of the bottom portion BM. Further, the head cover body 61A may not include the rib 63. However, from the viewpoint of ensuring the strength of the head cover body 61A, it is preferable to provide the rib 63.

The configuration such as the shape, the size, and the position of the concavity 65 is not limited to the example of the embodiment. In addition, the head cover body 61A may not include the concavity 65. Even in a case where the concavity 65 is not provided, the advantage described in (1) can be obtained by providing the auxiliary passage 66.

The configuration such as the shape, size, and position of the wall portion 64 is not limited to the example of the above-described embodiment. For example, the wall portion 64 may not be constituted by the first wall portion PW1 and the second wall portion PW2, and may be integrally formed. Further, the head cover body 61A may not include the wall portion 64.

The configuration of the auxiliary passage 66 is not limited to the example of the embodiment. The auxiliary passage 66 is connected to at least the upstream passage 62A, and the advantage described in (1) can be obtained as long as the blow-by gas is conducted to the outlet passage 61B or the intake passage IP. For example, the auxiliary passage 66 may be connected to the second inner surface I2 of the bottom portion BM in the upstream passage 62A. The auxiliary passage 66 may be connected to a section of the upstream passage 62A on the upstream side of the wall portion 64. The first end of the auxiliary passage 66 may be directly connected to the first inner surface I1 instead of the bottom surface of the concavity 65. The auxiliary passage 66 may be branched in the middle and connected to both the outlet passage 61B and the intake passage IP. Further, the head cover body 61A may include two or more auxiliary passages 66.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A cylinder head cover for a hydrogen-fueled internal combustion engine, comprising:

a head cover body that defines a main passage for blow-by gas that has leaked from a combustion chamber to a crankcase; and an outlet passage that is connected to a downstream end of the main passage and configured to conduct the blow-by gas to an intake passage, wherein the main passage includes a restriction in a middle of the main passage, a section of the main passage on an upstream side of the restriction is referred to as an upstream passage, a section of the main passage on a downstream side of the restriction is referred to as a downstream passage, a cross-sectional flow area of the restriction is smaller than a cross-sectional flow area of the upstream passage and smaller than a cross-sectional flow area of the downstream passage, and the cylinder head cover further comprises an auxiliary passage that is connected to the upstream passage and configured to conduct the blow-by gas to the outlet passage or to the intake passage, wherein the head cover body includes a plurality of ribs that protrudes from a wall surface that defines the main passage, a dimension in a direction orthogonal to the wall surface is defined as a height dimension, and the height dimension of a rib in the downstream passage is smaller than the height dimension of a rib in the upstream passage.

2. The cylinder head cover according to claim 1, further comprising a wall portion protruding from an inner surface of the head cover body in the upstream passage, wherein the wall portion intersects an arbitrary line segment connecting an upstream end of the main passage and the restriction.

3. The cylinder head cover according to claim 2, wherein the auxiliary passage is connected to a section of the upstream passage that is on a downstream side of the wall portion.

4. The cylinder head cover according to claim 1, wherein the head cover body includes a concavity that is recessed from an inner surface of the upper passage toward an outside of the main passage, and the auxiliary passage is connected to the concavity.

* * * * *